United States Patent [19]

Shimoda

[11] Patent Number: 5,337,049
[45] Date of Patent: Aug. 9, 1994

[54] EFFICIENT CODING SIGNAL PROCESSOR

[75] Inventor: Kenji Shimoda, Yokohama, Japan

[73] Assignee: Kabushiki Kaisha Toshiba, Kawasaki, Japan

[21] Appl. No.: 953,819

[22] Filed: Sep. 30, 1992

[30] Foreign Application Priority Data

Oct. 1, 1991 [JP] Japan ................. 3-253709

[51] Int. Cl.$^5$ ........................... H04N 7/12
[52] U.S. Cl. ........................... 341/50; 348/390; 348/420
[58] Field of Search ............ 341/50; 358/133, 136

[56] References Cited

U.S. PATENT DOCUMENTS

| | | | |
|---|---|---|---|
| 4,943,855 | 7/1990 | Bheda et al. | 358/133 |
| 4,984,076 | 1/1991 | Watanabe et al. | 358/133 |
| 5,128,758 | 7/1992 | Azadegan et al. | 358/133 |
| 5,179,442 | 1/1993 | Azadegan et al. | 358/133 |
| 5,196,933 | 3/1993 | Henot | 358/136 |

*Primary Examiner*—Marc S. Hoff
*Attorney, Agent, or Firm*—Cushman, Darby & Cushman

[57] ABSTRACT

An efficient coding signal processor for encoding information signals input in a sequence of block units in a manner of unifying an amount of information at a unit of N frames (N≧1) which includes a block activity calculator for calculating a block activity for every block of the information signals in a present frame, a frame activity calculator for calculating a frame activity from the block activity of the block in the preceding frames, a code amount allocator for allocating an amount of codes for every block in the encoding process using the predicted frame activity, and a code amount allocation controller for controlling the amount of codes to be allocated for every block up to a preselected bit rate by monitoring the amount of codes allocated by the code amount allocator for the period of one frame.

12 Claims, 8 Drawing Sheets

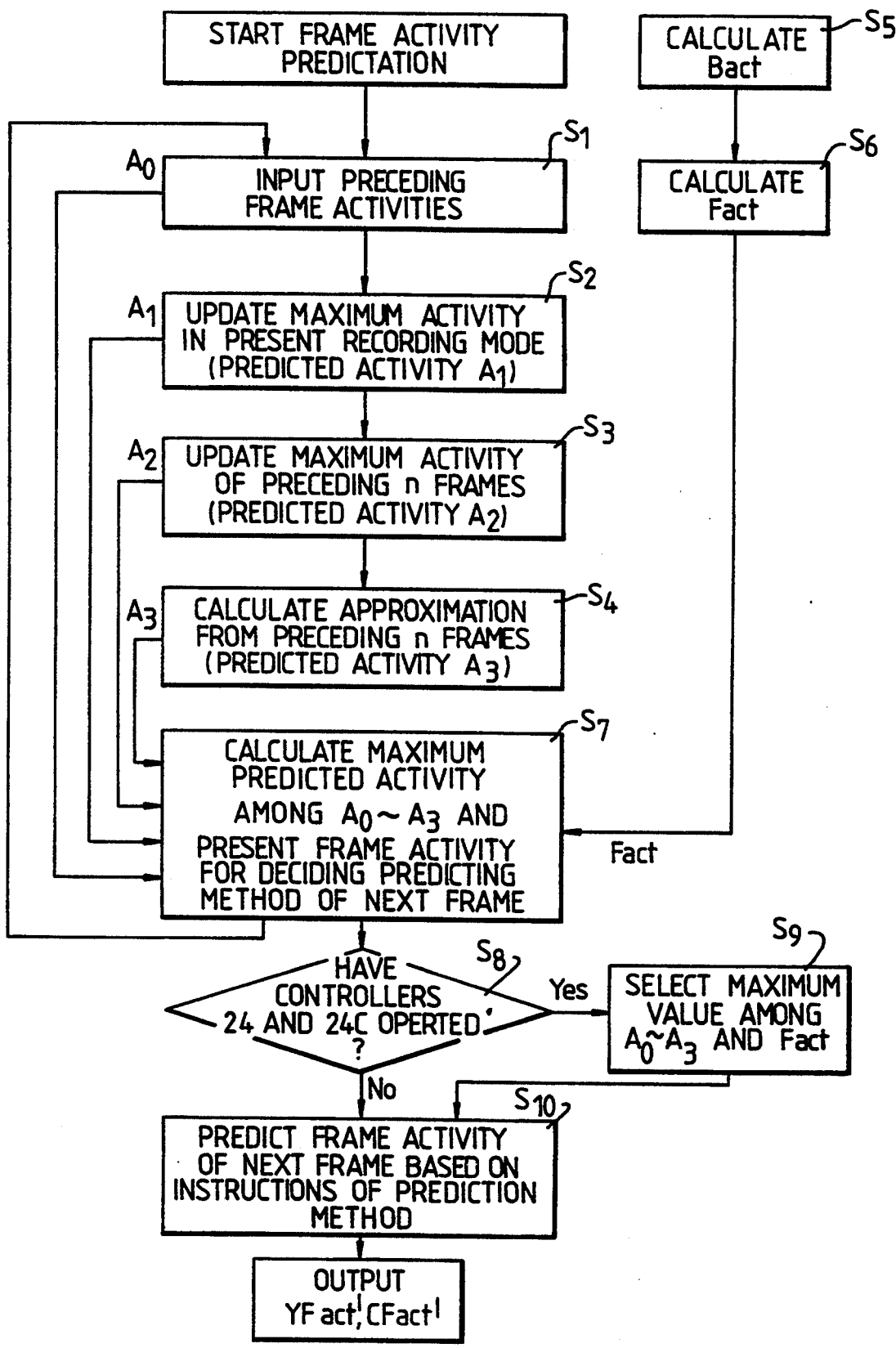

EFFICIENT CODING SIGNAL PROCESSOR

FIELD OF THE INVENTION

The present invention relates to a signal processor for efficiently encoding information signals such as digital image data.

BACKGROUND OF THE INVENTION

The digital processing of images has rapidly progressed in recent years. In particular, various systems of efficient coding for compressing image data have been proposed as standards. Such efficient coding technology is used to encode image data with a reduced bit rate for improving of digital transmission, recording, etc. The CCITT (Comite Consulatif International Telegraphique et Telephoonique, or International Committee for Telephone and Telegraph) has issued: 1) Recommendation H. 261 entitled Video Coding Standard for Video-Conference and Video-Phone, 2) a JPEG (Joint Photographic Experts Group) system for encoding color still pictures and 3) an MPEG (Moving Picture Experts Group) system for encoding moving pictures (see "Unification of Efficient Encoding Systems for Images" in "Nikkei Electronics," Oct. 15, 1990, No. 511, pp. 124-129). All of these three proposals are systems principally based on a discrete cosine transform (DCT) operation.

Shown in FIG. 1 is a block diagram of a conventional efficient coding signal processor using such a DCT operation.

A luminance signal Y and two color difference signals Cr and Cb of digital image data are processed separately from each other. The luminance signal Y is transmitted in a field sequence to an input terminal 1 and stored into a field memory 2. On the other hand, the color difference signals Cr and Cb are input acrosss two input terminals 1r and 1b and are stored into a field memory 2c after multiplexed by a multiplexer 13. As the color difference signals Cr and Cb are processed after the multiplexer 13 in the same manner as the luminance signal Y, only the processing of the luminance signal Y will be representatively described hereinafter.

After conversion into a frame construction at the field memory 2, the luminance signal Y is applied to a DCT circuit 3 in blocks of 8×8 pixels, i.e, a square block of 8 pixels in the horizontal direction by 8 pixels in the vertical direction. The DCT circuit 3 generates DCT coefficients by an orthogonal transform of its input signals according to an 8×8 two-dimensional DCT. These DCT coefficients are arranged in a sequence beginning from horizontal and vertical low frequency components to their high frequency components to yield a DC coefficient representing an average of all data and sixty-three pieces of AC coefficients. The DCT coefficients are read sequentially from the horizontal and vertical low frequency components by a zigzag scan and then supplied to a quantizer 5 through a frame memory 4. The quantizer 5 reduces an amount of data (amount of data or the number of bits) by dividing the DCT coefficients read through the zigzag scan by quantization coefficients read from a quantizing table 10. Thus, the redundancy of each block signal is reduced.

Further, the quantized data are applied to a variable length encoder 6 to be encoded into, for instance, Huffman codes, based on a result calculated from a statistic amount of a quantized output. As a result, data having a high possibility of occurrence are allocated with a short length of bits, while data having a low possibility of occurrence are allocated with a long length of bits. In this manner the amount of transmission data is further reduced.

When encoded as Huffman codes, image data compressed into an amount for one sheet are made variable due to changes of image patterns. Therefore, data management in a recording operation for a prescribed recording medium is extremely inconvenient as it is unable to determine an amount of original recordable data prior to their recording operation. For this reason, a code amount allocator 11 is provided for limiting the amount of the compressed data of every frame to be equal to or less than a prescribed desired amount of image data. In this case, to compress data without deterioration of the image quality, the quantization coefficient for each block is varied in response to the input digital image data. In other words, a coefficient "a" responsive to a definition of image (i.e., a fineness of image or a ratio of high frequency component to whole frequency components) is achieved, and then the quantization coefficient is varied by multiplying a coefficient read from the quantizing table 10 with the coefficient "a". Circuit blocks 12 and 12c which are depicted by the broken line construct each adaptive quantization and variable length encoding circuits.

Now an allocation operation of bits for fixing bit rate will be described. In a block activity calculator 7c, a block activity representing an image definition of a block unit is calculated from a sum of the absolute values of the sixty-three AC coefficients contained in each block and applied to a frame activity calculator 8 and also, to the code amount allocator 11 via a frame delay circuit 9. Similar to such a block activity of the luminance signal Y, a block activity of the color difference signals Cr and Cb are also input to the frame activity calculator 8.

The frame activity calculator 8 accumulates block activities YBact and CBact of every block for one frame period, calculates frame activities YFact and CFact and obtains a ratio of the amounts of codes of the luminance signal Y and the chrominance signal C to be allocated based on these two frame activities YFact and CFact. That is, a frame activity represents an image definition of one frame unit. Then, respective amounts of codes (i.e., an amount of data and an amount of bits) YFbit and CFbit which are able to be used for the luminance signal Y and the chrominance signal C in one frame (hereinafter refered to as allocation amount of codes) are determined. Furthermore, an average activity Aact for every block is calculated by adding the allocation amounts of codes YFbit and CFbit together and the average activity Aact is converted into the coefficient "a". This coefficient "a" is applied to the quantizing table 10 so that the quantization coefficient is changed.

The block activity YBact from the block activity calculator 7 is delayed for a timing adjustment in the frame delay circuit 9 for a time corresponding to the frame activity YFact calculation and the bit allocation calculation and input to the code amount al locator 11. The allocation amounts of codes YFbit and the frame activity YFact are also input to the code amount allocator 11 so that the code amount allocator 11 calculates an allocation amount of codes YBbit which is able to be used for every block in accordance with the following equation (1) based on the block activity YBact, the allocation amount of codes YFbit and the frame activity YFact.

$$YBbit = YFbit \times YBact/YFact \quad (1)$$

As accumulation sums of the code allocation amount YBbit and the frame activity YBact in every frame are equal to the code allocation amount YFbit and the frame activity YFact, respectively, it becomes possible to suppress a predetermined amount of codes for every frame unit in this system. When the quantized output from the quantizer 5 is applied to the variable length encoder 6 and then encoded into a variable length code, the allocation amount of codes is assumed to be n2 bits. If an actual amount of codes is equal to n1 bit, in case of $n1 < n2$, i.e., the amount of quantized output bits n1 being smaller than the n2 bits, only a data amount less than the n2 bits are output as a variable length encoding data. Further, when $n1 > n2$, quantized outputs are all output as variable length encoding data. In this way, the variable length encoder 6 includes a bit limitation processing circuit (not shown) in order perform the bit allocation operation.

As described above, in the conventional efficient coding signal processor, as shown in FIG. 1, the block activity YBact and the frame activity YFact are calculated by using the present frame and its block. Also, the amount of codes capable of being used in every block is determined by multiplying the amount of codes capable of being used in every frame by the ratio of the block activity and the frame activity from the present frame and its block (Bact/Fact). However, as a period of one frame is required for calculating the frame activity Fact, the frame memory 4 is required to give an output from the DCT circuit 3 to the quantizer 5 after delaying the output for the period of one frame. In addition, there is also a problem in that the frame delay circuit 9, for delaying the block activity for the one frame period, was required in order to perform the allocation operation in the code amount allocator 11.

As described above, as the frame activity Fact was required for calculating the amount of codes to be allocated for fixing the bit rate, the conventional efficient coding signal processor had a problem in that two delay circuits are required, that is, a frame memory for delaying DCT coefficient by one frame period to determine the frame activity Fact, and another frame memory for delaying the block activity by one frame period until the allocation operation starts.

SUMMARY OF THE INVENTION

It is, therefore, an object of the present invention provide an efficient coding signal processor capable of reducing an amount of memories.

In order to achieve the above object, an efficient coding signal processor for encoding information signals input in a sequence of block units in a manner of unifying an amount of information at a unit of N frames ($N \geq 1$), which includes a block activity calculator for calculating a block activity for every block of the information signals in a present frame, a frame activity calculator for calculating a frame activity from the block activity of the block in the preceding frames, a code amount allocator for allocating an amount of codes fop every block in the encoding process using the predicted frame activity, and a code amount allocation controller for controlling the amount of codes to be allocated for every block up to a preselected bit rate by monitoring the amount of codes allocated by the code amount allocator for the period of one frame.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a flowchart for explaining the adaptive special method;

DESCRIPTION OF THE PREFERRED EMBODIMENTS

Figure 1:
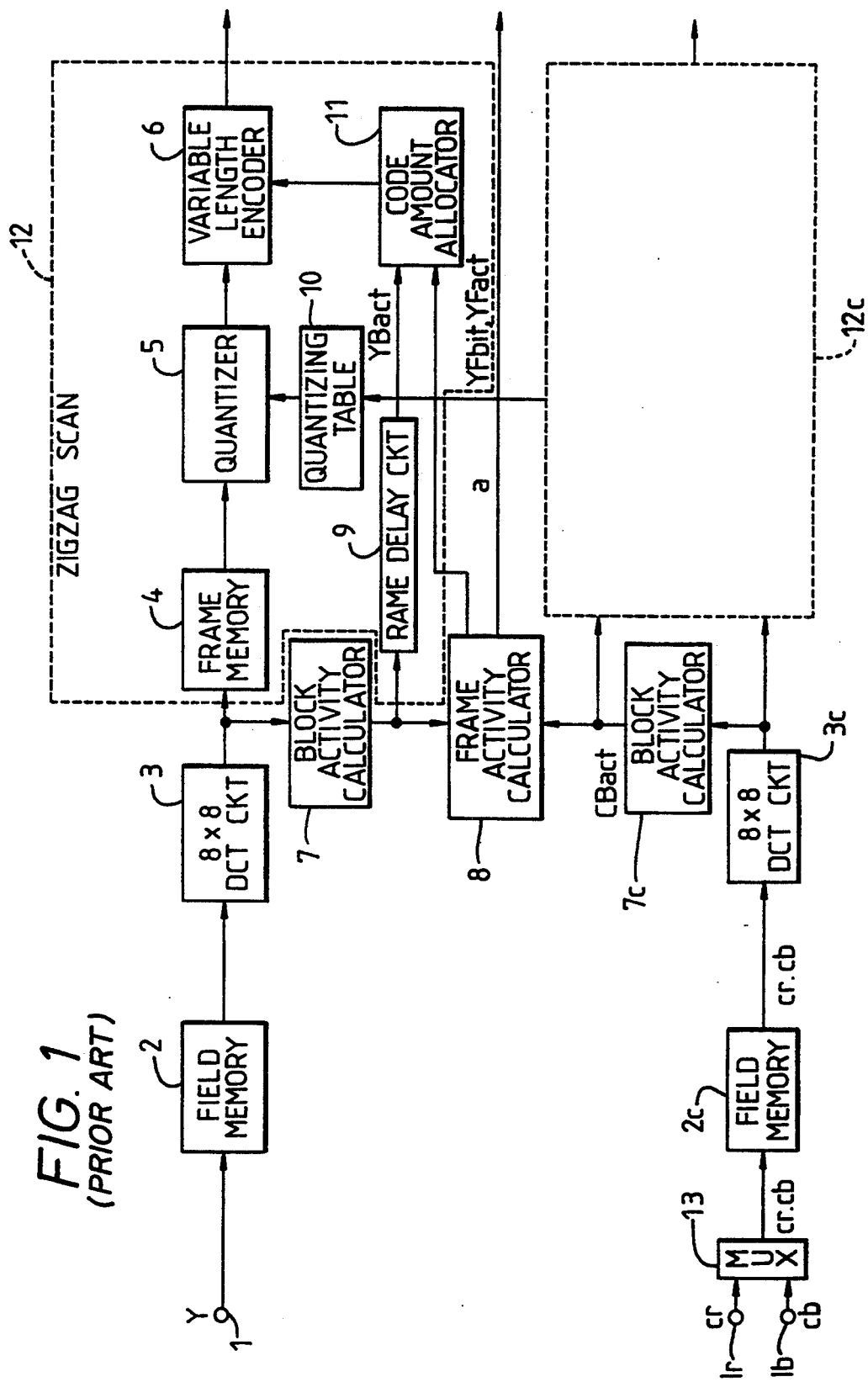
FIG. 1 is a block diagram showing a conventional efficient coding signal processor.

The present invention will be described in detail with reference to the FIGS. 2 through 8. Throughout the drawings, reference numerals or letters used in FIG. 1 will be used to designate like or equivalent elements for simplicity of explanation.

Referring now to FIGS. 2 through 7, a first embodiment of the efficient coding signal processor according to the present invention will be described in detail.

The first embodiment of the efficient coding signal processor is constructed to use a frame activity calculated from a present frame and a block activity calculated from a preceding frame, instead of a block of the present frame, as described in detail below.

Figure 2:
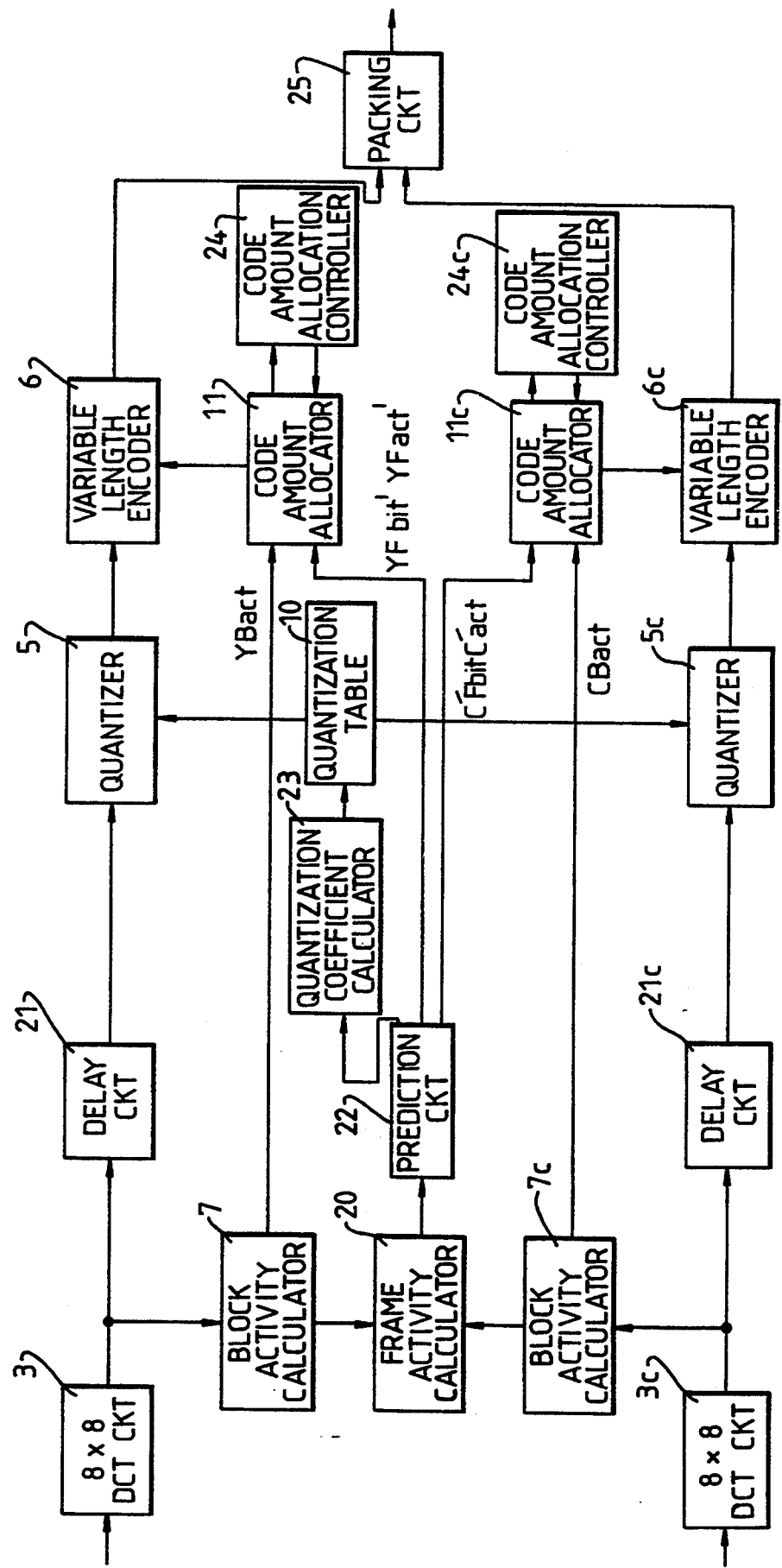
FIG. 2 is a block diagram showing a first embodiment of the efficient coding signal processor according to the present invention.

In FIG. 2, a luminance signal at a block unit of $8 \times 8$ pixels is input to a DCT circuit 3, while a multiplex signal of two color difference signals Cr and Cb is input to another DCT circuit 3c. The DCT circuit 3 outputs the DCT coefficient of the luminance signal Y to a delay circuit 21 and a block activity calculator 7 through an orthogonal transform. The delay circuit 21 delays the DCT coefficient of the luminance signal Y for the period of several blocks, which are required for calculating an amount of codes to be allocated, as described later, and required by the zigzag scan so that higher frequency components are sent out in order from DC components in the horizontal and vertical directions to a quantizer 5. The quantizer 5 outputs the DCT coefficient with a reduced bit rate by quantizing them based on the quantization coefficient from a quantizing table 10.

On the other hand, the block activity calculator calculates a block activity YBact representing an amount of information (i.e., an information of definition) of each block of the present frame for every block into which the block activity YBact is to be input. The block activity YBact is output to a frame activity calculator 20 and a code amount allocator 11. The frame activity calculator 20 is also supplied with a block activity CBact from the color difference signals system. Thus the frame activity calculator 20 calculates present frame activities YFact and CFact of the luminance signal Y and the chrominance signal C by accumulating the block activities YBact and CBact for a period of one frame, and outputs them to a prediction circuit 22 at the time the frame ends.

The prediction circuit 22 may comprise a circuit operable of logical and numerical operations, process such as a microcomputer or a DSP (Digital Signal Processor). The prediction circuit 22 predicts a frame activity of the next frame. In this case, the prediction circuit 22 performs the prediction separately for the luminance signal Y and the chrominance signal C. Following items are selectively available for prediction in the prediction circuit 22.

a. Maximum activity in the present recording mode;
b. Maximum activity in the last m frames;
c. Activity in the last one frame;
d. Activity predicted by an approximation for the last n frames; and
e. Other available Activities. In these five items, the item (c) causes the prediction to be most simple. The item (a) is used in the operation after entering in the present recording mode. This item (a) is effective to the prediction when images excluding scene changes (i.e., images with small activity change) are taken by a camera. The item (d) can be exemplified by the first order approximation as shown in the following equation (2).

$$Fact0 = Fact-1 + (Fact-1 - Fact-2) \quad (2)$$

Further, as a method of selectively using the above items, various systems as follows can be considered:

(1) A way of fixing any one of the items in advance (Fixing System);
(2) A way of adaptively selecting a most optimum one of the items as well as frame activities determined from every frame (Adaptive System); and
(3) A way of using a special routine for selecting the maximum one of the items, if a predicted frame activity is smaller than an actual activity (a case in which the code amount allocation control circuit described later is operable) (Adaptive Special System).

In the system (2), the prediction method may change for every frame. Shown in FIG. 3 is a flowchart for explaining the adaptive special system (3).

At present, the prediction operation for the (K+1)th frame, i.e., the next frame, is initiated at the Kth frame. First, at Step S1 in FIG. 3, the frame activity of the preceding frame ((K−1)th frame) is taken and output as the predicted activity A0. At Step S2, the maximum frame activity in the present recording mode is updated. That is, if the frame activity in Step S1 is the maximum activity in the present recording mode, the predicted activity A1 is stored by updating the predicted activity A0.

In Step S3, the maximum one of the past m frame activities is updated and stored as the predicted activity A2. Then, in Step S4, the predicted activity A3 is predicted by performing an approximate calculation based on the activities of past n frames.

On the other hand, the block activity Bact of the present Kth frame is determined based on this block activity Bact in Step S6. In Step S7, the maximum predicted activity among the predicted activities A0 through A3 (frame activities for the Kth frame predicted based on the (K−1) frame activity) and the present frame (the Kth frame) activity Fact is calculated. In Step S8, it is judged whether the code amount allocation controllers 24 and 24c were operated during the Kth frame. That is, if the maximum predicted activity predicted in Step S7 is larger than the actual frame activity Fact, the process moves from Step S8 to Step S10. If the maximum predicted activity is smaller than the actual frame activity Fact, the process moves from Step S8 to Step S9 and the maximum value among the predicted activities A0 through A3 and actual frame activity Fact. In Step S10, the frame activity of the next frame is predicted based on the instructions of the prediction method. Thus, the next frame activities VFact' and CFact' are determined.

The frame activity YFact' of the predicted next frame, i.e., (K+1)th frame is applied to a quantization coefficient calculator 23, the code amount allocator 11 and another code amount allocator 11c. The quantization coefficient calculator 23 is to calculate the coefficient "a" that was performed by a frame activity calculator 8 shown in FIG. 1, and calculating Coefficient "a" from the next frame activity YFact', outputs it to the quantizing table 10. Further, the calculations of the amounts of codes to be allocated to the luminance signal Y and the chrominance signal C, that were performed by the frame activity calculator 8 shown in FIG. 1 is now performed by the prediction circuit 22. That is, the prediction circuit 22 predicts YBbit' and CFbit', which are the allocation bit amounts of the luminance signal Y and the color difference signal C which are able to be used in the next one frame.

The next frame activity YFact' and next frame allocation bit amount YBbit' are given to the code amount allocator 11. Upon receipt of Coefficient "a" given from the quantization coefficient calculator 23, the quantizing table 10 changes stored data based on the coefficient "a" and outputs as a quantization coefficient to the quantizer 5 and another quantizer 5c.

The present frame block activity YBact, predicted next frame activity YFact', and next frame allocation bit amount YFbit' are input to the code amount allocator 11, which predicts the allocation amount of codes YBbit's for every block through the calculation according to the following equation (3).

$$YBbit' = YFbit' \times YBact/YFact' \quad (3)$$

Further, the same calculation is also carried out for the chrominance signal C.

Here, if the following equation (4) is established, YFbit+CFbit=YFbit'+CFbit'=constant is established, and thus the amount of codes is suppressed below a predetermined amount of codes.

$$EBbit' = YFact' \leq YFact \quad (4)$$

However, if the following equation (5) is established, the numerator becomes larger than the denominator in the equation (3) and the amount of codes in a variable length encoder 6 may exceed a predetermined amount of codes.

$$EBact = YFact > YFact \qquad (5)$$

So, in this embodiment the code amount allocator 11 is controlled by the code amount allocation controller 24. If the predicted frame activity is smaller than the present frame activity and used amount of codes may exceed a predetermined value, the code amount allocation controller 24 corrects the calculation of the amount of codes to be allocated according to the equation (3) to enable the encoding up to the final block without allowing the amount of codes to reach a predetermined value.

Figure 4B:
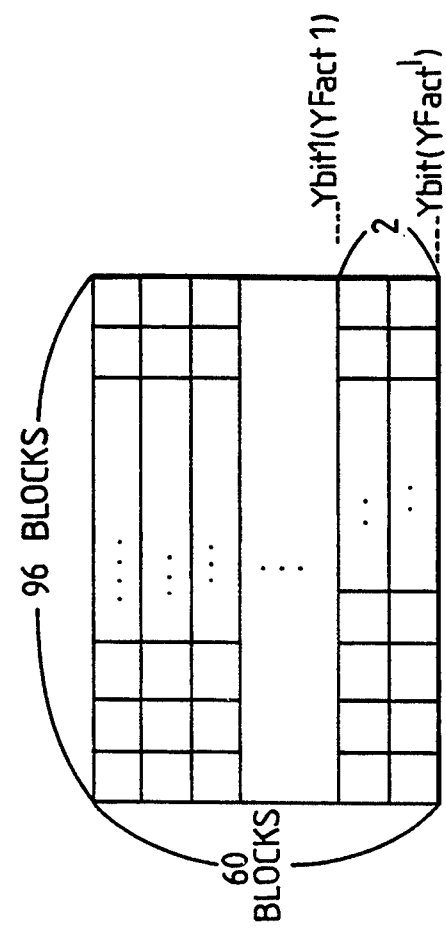
FIGS. 4a and 4b are explanatory diagrams for explaining how the fixing bit rate is controlled by the code amount allocation controller 24 of FIG. 2.
Figure 4A:
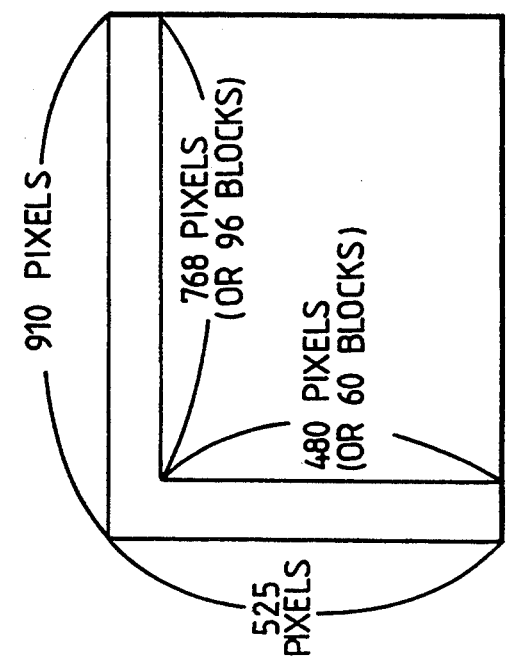
Figure 5:
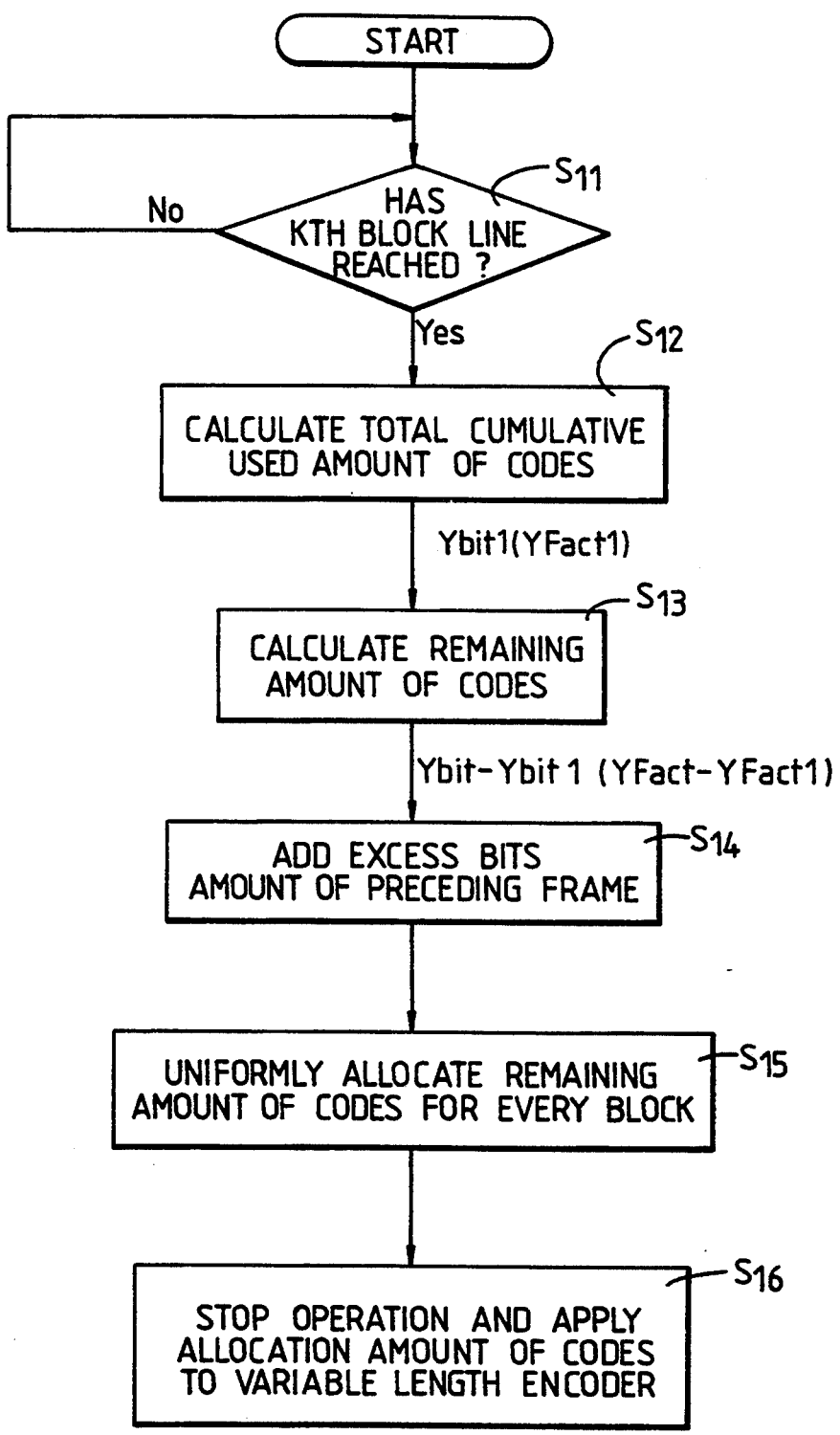
FIG. 5 is a flowchart for explaining the control of fixing bit rate by the code amount allocation controller 24 of FIG. 2.

The explanatory diagram of FIG. 4 and the flowchart of FIG. 5 are for explaining the control of fixing the bit rate according to the code amount allocation controller 24.

For instance, one frame consists of 525×910 pixels as shown in FIG. 4(a). Of these pixels, 480×768 effective pixels are divided into 8×8 blocks. In other words, 98 blocks in the horizontal direction and 60 blocks in the vertical direction. The position of each block in the horizontal direction is called a block line. The code amount allocation controller 24 gives allocation amount of codes for every block, by the code amount allocator 11, up to the kth block line directly to the variable length encoder 6.

That is, in Step S11 in FIG. 5, it is judged whether the kth block line has reached. For instance, if k is set at 58, the variable length encoding is carried out up to the 58th block line based on the amount of codes to be allocated by the code amount allocator 11. When the 58th block line is reached, in Step S12, a cumulative used amount of codes Ybit1 (activity YFact1) up to the 58th block line is calculated. In Step S13, the effectively remaining amount of codes is calculated. That is, the operation Ybit−Ybit1 (or YFact−YFact1) is carried out.

In Step S14, the difference between the preceding frame activity and the actual amount of codes is added to the remaining amount of codes. This addition is carried out only when the code amount allocation controlled 24 failed to operate in the preceding frame. In Step S15, the result of this addition is uniformly allocated to each block. Then, in Step S16 the code amount allocelot 11 is stopped to output and the variable length encoder 6 is controlled based on the result in Step S15. In other words, the amount of codes for each block of the 59th and 60th block lines is controlled by the code amount allocation controller 24 as shown in FIG. 4(b). Thus, the remaining amount of codes is uniformly allocated to each of the remaining two blocks and the final amount of codes will become Ybit (YFact').

As the amount of codes is limited by the code amount allocator 11 and the code amount allocation controller 24, the variable length encoder 6 encodes the quantized output of the quantizer 5 into the Huffman codes and outputs to a packing circuit 25. In other words, the quantizer 5 outputs a sequence of data from the low band components to the high band components. This data sequence is converted to a data sequence consisting of a set of consecutive zeros (hereinafter referred to as a zero-run) of quantized output data, a code length of non-zero values (hereinafter referred to as non-zero coefficient) appearing after zeros and data command of non-zero coefficient. The variable length encoder 6 has a two-dimensional Huffman table and its address is designated by a combination of zero-run and nonzero coefficient code length of the quantized output. The Huffman table stores codes in a smaller amount of bits for addresses designated by data having statistically high probability of generation. The encoding into the Huffman code is carried out in this way, allocating shorter bits to data having high possibility of occurrence and longer bits to data having low possibility of occurrence, and the amount of data to be transmitted is thus further reduced. After the Huffman coding of the quantized output, the variable length encoder 6 outputs non-zero coefficient data code by adding to the Huffman code.

On the other hand, the constructions of the DCT circuit 3c, a delay circuit 21c, the quantizer 5c, the code amount allocator 11c, the code amount allocation controller 24c and a variable length encoder 6c of the chrominance signal C system are the same as those of the DCT circuit 3, the delay circuit 21, the quantizer 5, the code amount allocator 11, the code amount allocation controller 24 and the variable length encoder 6 of the luminance signal Y system, respectively. The packing circuit 25 outputs a variable length encoded data of the luminance signal Y and the color difference signals by multiplexing.

Now, the operation of the embodiment in the construction described above will be explained. Further, as the operation of the color difference signal system is the same as that of the luminance signal system, the operation of the luminance signal system only is explained.

The DCT coefficient from the DCT circuit 3 is applied to the quantizer 5 after delayed by the delay circuit 21 for several blocks with the quantization based on the quantization coefficient from the quantizing table, then it is applied to the variable length encoder 6.

The DCT coefficient is also applied to the block activity calculator 7. This block activity calculator 7 calculates the present block activity that was already input and outputs it to the frame activity calculator 20. The frame activity calculator 20 is given the block activities YBact and CBact from the block activity calculator 7 and block activity calculator 7c, respectively, and calculating the frame activity YFact of the present frame, outputs it to the prediction circuit 22 when the frame ends.

The prediction circuit 22 predicts the next frame activity YFact' according to any one of the various methods as described above. The predicted frame activity YFact' is applied to the quantization coefficient calculator 23 and the code amount allocator 11. The quantization coefficient calculator 23 calculates coefficient "a" from the predicted frame activity YFact' and gives it to the quantizing table 10. The quantizing table 10 prepares a quantization coefficient based on this coefficient "a" and gives it to the quantizer 5. On the other hand, the code amount allocator 11 is also given the block activity YBact from the block activity calculator 7, and calculating the allocation amount of codes of luminance signal Y YFbit' through the operation according to the equation (3), outputs it to the variable length encoder 6.

The variable length encoder 6 encodes quantized output based on the predicted allocation amount of codes YFbit' of the next frame and is enabled without delaying a DCT coefficient by one frame period.

If the equation (4) is established, that is, if the predicted frame activity is larger than the actual frame activity, the variable length encoder 6 limits the amount of codes only by the allocation amount of codes YFbit' based on the operation of the above-mentioned equation (3) by the code amount allocator 11. In this case, a total amount of codes after encoding is kept within a predetermined amount of codes.

Here, it is assumed that the predicted frame activity YFbit' is smaller than the actual frame activity. In this case, if the allocation amount of codes based on the operation by the code amount allocator 11 is used, a total amount of codes may exceed the effective amount of codes.

So, the code amount allocation controller 24 limits the amount of codes to be allocated by the operating the code amount allocator 11 up to the kth block line as shown in Step S11 in FIG. 5. If the kth block line is reached, the effectively remaining amount of codes is calculated from the total cumulative used amount of codes used up to the kth block line in Steps S12 and S13. Then, the code amount allocation controller 24 uniformly allocates the remaining amount of codes or an added value of the remaining amount of codes and excess bits amount of the preceding frame, to the remaining blocks in Steps S14 and S15. Then, in Step S16 the code amount allocator 11 is stopped to operate and the allocation amount of codes determined in Step S15 is applied to the variable length encoder 6. Thus, it is possible to prevent a total amount of codes of the variable length encoder 6 from exceeding the effective amount of codes.

As described above, in this embodiment the bit allocation is carried out using the present block activity and the predicted frame activity and the encoding without using a delay memory is possible. Further, the fixing operation of the bit rate is possible by the code amount allocation controllers 24 and 24c while the image quality of the reproduced image is not deteriorated.

Figure 6:
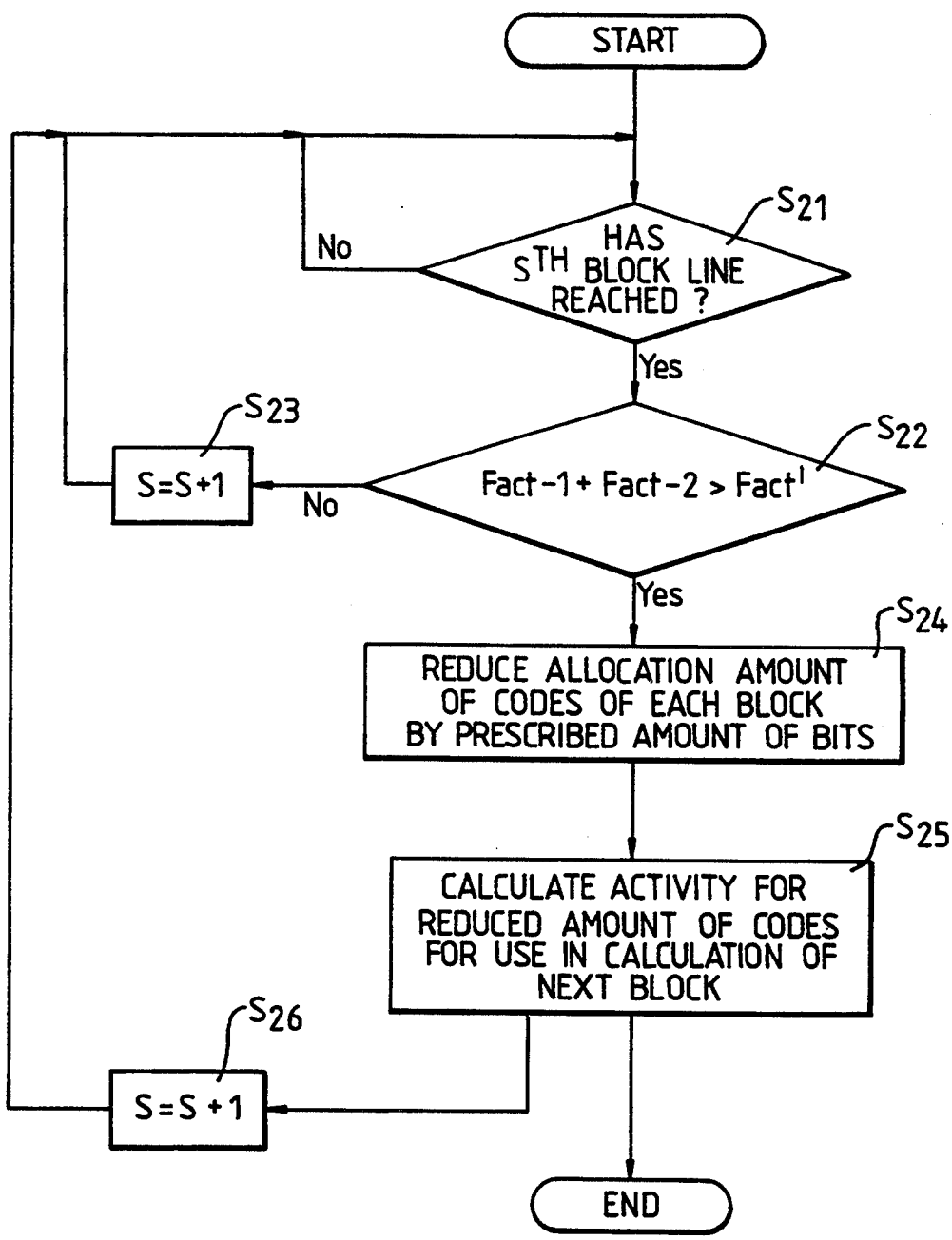
FIG. 6 is a flowchart for explaining an alternative code amount allocation control circuit of the efficient coding signal processor according to the present invention.

FIG. 6 shows a flowchart for explaining another embodiment of the coded allocation amount control circuit of the efficient coding signal processor according to the present invention.

The code amount allocation control circuit according to this embodiment performs the control of the fixing operation of the bit rate shown in the flowchart in FIG. 6.

Figure 7B:
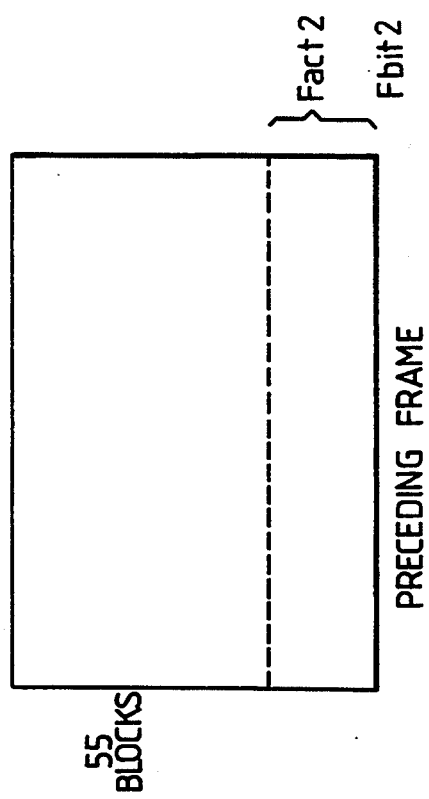
FIGS. 7a and 7b are explanatory diagrams for explaining the operation of the alternative code amount allocation control circuit as shown in FIG. 6.
Figure 7A:
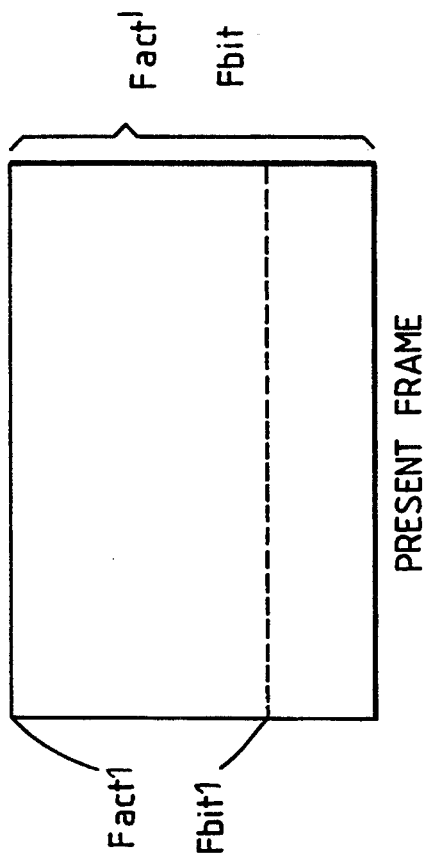

First, in Step S21 shown in FIG. 6 it is judged if the sth block line has been reached. FIG. 7 shows that the s is set at 55. The block activity after the 55th block line of the preceding frame is assumed to be Fact2 and the amount of codes to be Fbit2 as shown in FIG. 7(a), and the block activity up to the 55th block amount to be Fbit1 as shown in FIG. 7 (b).

When the sth (i.e., 55th) block line is reached, the frame activity of the present frame Fact1 and the frame activity of the preceding Fact2 are added up in Step S22 and this added value is compared with the predicted frame activity Fact'. If the added value is smaller than the predicted frame activity Fact', the process moves to the next block via Step S24.

On the other hand, if the added value is larger than the predicted frame activity Fact', the process moves to step S24 and the allocation amount of codes of each block determined by the code amount allocator 11 is reduced by a prescribed amount of bits. Then, in Step S25 the activity for the reduced amount of codes is calculated for use in calculation of the next block. The process then moves to the next block via Step S26.

Using the preceding frame activity Fact after the sth block line and the frame activity up to the sth block line of the present frame, it is judged if the amount of codes is limited to below the amount of codes of the preceding frame for each block line after the 56th block line. If the allocation amount of codes YFbit (YFact') is exceeded, a total amount of codes is limited not to exceed the effective amount of codes by controlling the code amount allocation circuit to reduce allocation amount of codes of each block by a predetermined amount.

Further, for the comparison in Step S22, an amount of excess bits of the preceding frame or the activity corresponding to the amount of excess bits may be used after corrected.

Figure 8:
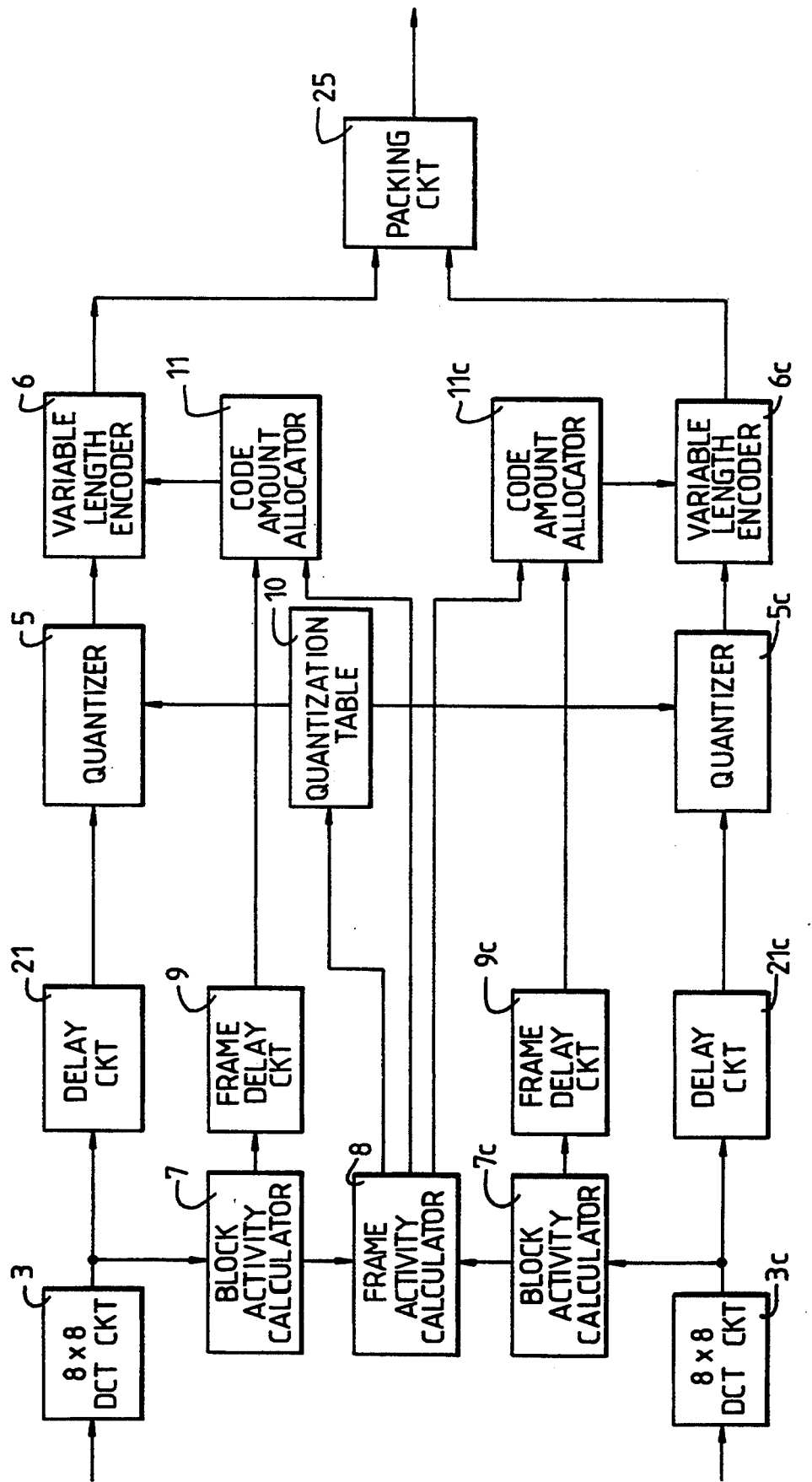
FIG. 8 is a block diagram showing a second embodiment of the efficient coding signal processor according to the present invention.

FIG. 8 is a block diagram showing another embodiment of the present invention. In FIG. 8, the same components as those in FIG. 2 are allocated with the same reference numerals and symbols and the their explanations will be omitted.

This embodiment differs from first embodiment shown in FIG. 2 by that it is constructed to use such a frame activity and a block activity both calculated from a preceding frame. Thus, the circuit construction has a difference from FIG. 2 by that the frame activity calculator 8 is used in place of the frame activity calculator 20 for removing the prediction circuit 22, the quantization coefficient calculating circuit 23 and the code amount allocation controllers 24 and 24c, while new frame delay circuits 9 and 9c, as shown in FIG. 1, are provided.

In the embodiments constructed as described above, the code amount allocators 11 and 11c determine the amounts of codes to be allocated by using the block activities and the frame activities of the preceding frames. Thus, at least one frame memory necessitated in the conventional processors can be eliminated. Even in this case, as EBact (total sum of the preceding frame block activities)=Fact (frame activity of the preceding frame) is established, a total amount of codes can be reduced to a predetermined bit rate. Further, if the image has a relatively slow moving pattern, the image quality of the reproduced image is also assured sufficiently.

In the present invention, the frame activity prediction means predicts a frame activity using prior frame activities determined by calculations for preceding frames. The code amount allocation means calculates an amount of codes to be allocated for every block from both the frame activity and the block activity. If the predicted frame activity is smaller than the actual activity, the amount of codes to be allocated by the code amount allocation means becomes larger than a predetermined value. In this case, therefore, the code amount allocation control circuit controls the amount of codes to be allocated so that the total amount of codes does not exceed a predetermined value while monitoring the amount of codes for the period of one frame.

As described above, the present invention can provide an extremely preferable efficient coding signal processor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A signal processor for efficiently encoding information signals input in a sequence of predetermined units, so that each of said units has a similar amount of information, comprising:
   first activity calculation means for calculating a first activity of a sub-unit of said information signals of a present unit;
   second activity calculation means for calculating a second activity from the first activity of the sub-unit calculated in a preceding unit of said information signals;
   code amount allocation means for providing coding that can be utilized by every sub-unit during the encoding process using the second activity; and
   code amount allocation control means for setting an amount of coding provided by said code amount allocation means for every sub-unit so that a preselected bit rate is not exceeded, by monitoring the amount of coding allocated by the code allocation means for the period of one unit of said information signals.

2. A signal processor for efficiently encoding information signals input in a sequence of block units making up a series of frames, said signal processor encoding the information so that each unit of N frames (N≧1) includes a similar amount of data, comprising:
   means for calculating a block activity for every block of said information signals;
   means for predicting a present frame activity on the basis of a preceding frame activity;
   code amount allocation means for allocating an amount of codes use during the encoding of said information signals on the basis of said calculated block activity and predicted frame activity; and
   code amount allocation control means for setting an amount of codes that can be provided by said code amount allocation means so that a preselected bit rate is not exceeded, by monitoring the amount of codes allocated by the code amount allocation means for the period of one frame.

3. A signal processor as in claim 2, wherein said code amount allocation means allocates an amount of codes on the basis of a calculated block activity of a present frame.

4. A signal processor as in claim 2, wherein said code amount allocation means allocates an amount of codes on the basis of a calculated block activity of said preceding frame.

5. A signal encoder for encoding an information signal, comprising:
   input means for inputting blocks of information, a predetermined number of said blocks making up one frame of said information signal;
   block activity calculation means for calculating an activity of every block being encoded;
   frame activity calculation means for calculating a present frame activity based on the block activity of a preceding frame;
   means for encoding said information signals by assigning predetermined codes to represent said information blocks; and
   means for controlling the encoding of said information signals by establishing a predetermined number of codes, for use by the encoding means, on the basis of a preceding frame activity, and adjusting an amount of said predetermined number of codes on the basis of the present frame activity.

6. A signal encoder as in claim 5 wherein said information signals are video signals.

7. A signal encoder as in claim 6 wherein said information signals include a luminance signal and color difference signals.

8. A signal encoder as in claim 5, wherein said block activity calculation means calculates the amount of information contained within each block.

9. A signal encoder as in claim 5, wherein said frame activity calculation means includes a prediction circuit for predicting the activity of a next frame along with an information signal bit amount for use by the next frame.

10. A signal encoder as in claim 5, further comprising a quantizer for reducing the bit rate of the blocks of information before being encoded.

11. A signal encoder as in claim 9, wherein said quantizer reduces said bit rate on the basis of said frame activity calculation means.

12. A signal encoder as in claim 5, wherein said encoding means converts said information signals into Huffman codes, where data having a high probability of occurrence are designated with shorter bit sequences and data having a low probability of occurrence are designated with longer bit sequences.

* * * * *